United States Patent [19]

Simbal

[11] Patent Number: 4,682,863
[45] Date of Patent: Jul. 28, 1987

[54] ULTRA-WIDE ANGLE MICROGRAPHIC LENS

[75] Inventor: John J. Simbal, Woodbury, Minn.

[73] Assignee: Minnesota Mining and Manufacturing Company, St. Paul, Minn.

[21] Appl. No.: 769,441

[22] Filed: Aug. 26, 1985

[51] Int. Cl.[4] .............................................. G02B 9/64
[52] U.S. Cl. .................................................. 350/463
[58] Field of Search ........................................ 350/463

[56] References Cited

U.S. PATENT DOCUMENTS 3,997,247 12/1976 Glatzel et al. .

Primary Examiner—John K. Corbin
Assistant Examiner—Rebecca D. Gass
Attorney, Agent, or Firm—Donald M. Sell; James A. Smith; John C. Barnes

[57] ABSTRACT

A wide-angle lens covering a half angle of 33 degrees and capable of being focussed over a range of 7.4X to 30X, with a satisfactory resolution and distortion at 100% diagonal of under 0.2% at all reductions substantially extends the usefullness of such a micrographic lens.

2 Claims, 6 Drawing Figures

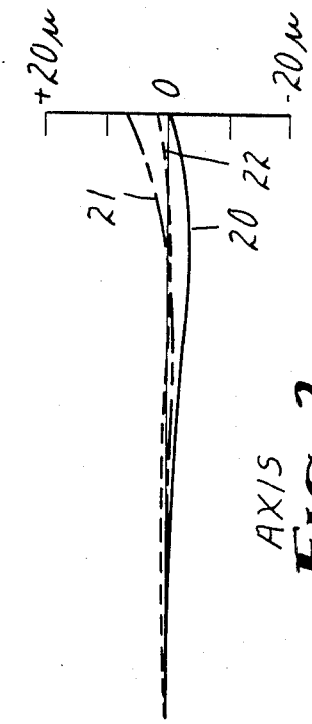
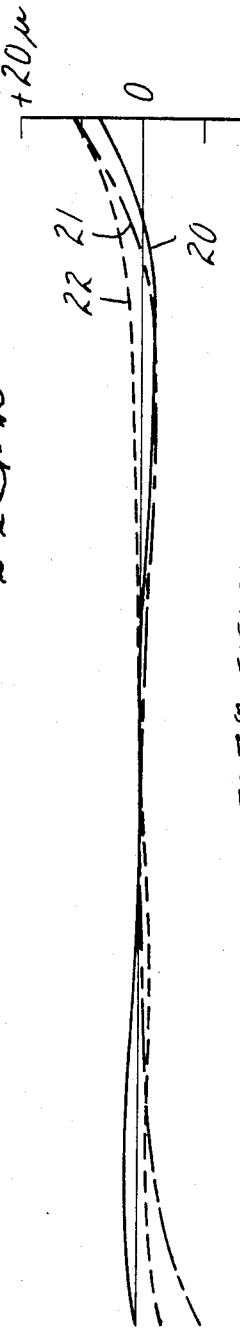
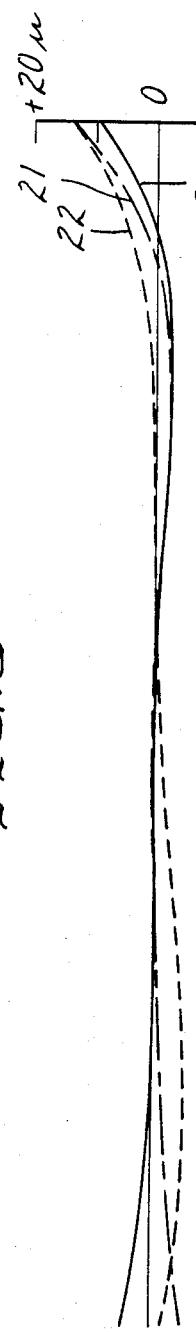
FIG. 2 AXIS
FIG. 3 70.7% FIELD
FIG. 4 100% FIELD

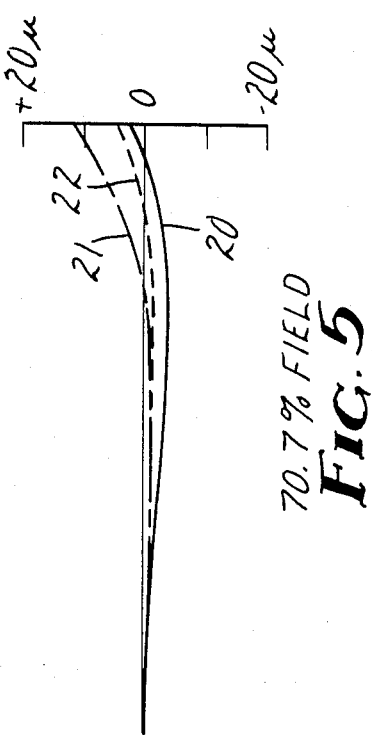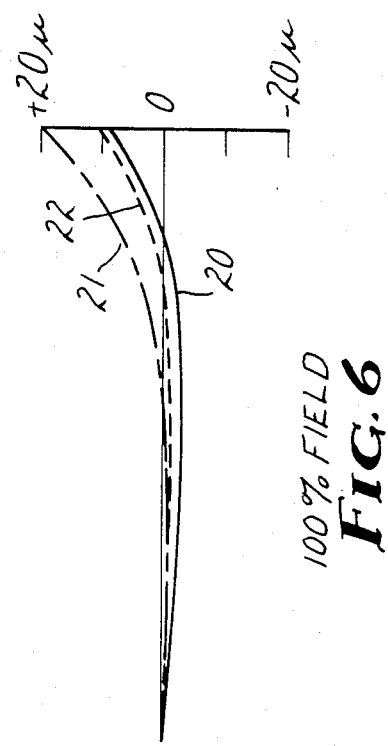

ULTRA-WIDE ANGLE MICROGRAPHIC LENS

BACKGROUND OF THE INVENTION

1. Field of the Invention

This invention relates to an improvement in wide angle lenses for use in micrographics to reduce engineering drawings to microimage size upon full exposure with improved resolution and simplicity in the individual lens elements. In one aspect this invention relates to an ultra-wide angle lens using the most desirable glasses and minimizing the thickness and radii of the individual lens elements.

2. Description of the Prior Art

Wide angle lenses for reducing the light path and simplifying micrographic imaging equipment is a continual field of inventive endeavor, and design of such lenses affording improvements in angularity without sacrificing resolution is important as well as placing emphasis on the ease of manufacture of such wide-angle lenses and using glasses which are common, avoiding those which are easily stained, excessively soft, or prone to striae.

The lens of the present invention is comparable to other unsymmetrical wide-angle lenses such as those illustrated and discussed in U.S. Pat. No. 3,997,247 on the basis of performance in that the lens of the current invention also approaches the diffraction limit. The prior art wide angle lens comprises five or six lens groups, a "group" being understood not to necessarily imply a combination of two or more lens elements. The lens of the present invention however differs in that it includes 10 lens elements which are divided into four groups. The first group comprises two meniscus lens elements which are axially separated, the second group comprising an element having a front face which is convex, and the group is provided with converging power, an aperture, a third group of negative power with the third lens element of the group being convex toward the rear of the lens; and the fourth group comprises a cemented doublet.

The lens elements of the present invention use glasses with desirable chemical and mechanical properties and all of the lenses have an axial thickness greater than about 10% of the diameter. Lenses with small radii of curvature are avoided. Also, triplet constructions for the lens elements are avoided. The lens provides wide angular coverage to provide a short light path at reductions of 16X, 24X and 30X.

Summary of the Invention

The ultra-wide angle lens of the present invention comprises 10 lens elements positioned in four general groups and all airspaced from one another. The first group comprises a pair of airspaced meniscus lens elements of converging power, the second group consists of a cemented doublet and a biconvex singlet, the third group consists of a plano-concave singlet and a cemented doublet, and the last group comprises a cemented doublet. An aperture stop is located between the second and third groups. The lens has a finite f-number of f/5.6 at 30X and has an equivalent focal length of 40.44 mm. The lens provides an ultra wide angle having a half angle of 33 degrees and its resolution will meet or exceed the resolution tests for class 1 microfilm. Distortion at 100% diagonal is under 0.2% for all reductions.

The lens elements are designed for ease of manufacture, and the lens elements have an axial thickness to diameter ratio equal to or greater than 10%.

DESCRIPTION OF THE DRAWING

The present invention will be further described with reference to the accompanying drawing wherein:

FIG. 2 is a curve showing sagittal and tangential ray intercept curves in primary, secondary and tertiary light on axis;

FIG. 3 is a curve showing the tangential ray intercept curves for the primary, secondary, and tertiary light rays at 70.7% field;

FIG. 4 is a curve showing the tangential ray intercept curves for the primary, secondary, and tertiary light rays at 100% field;

FIG. 5 is a curve showing the sagittal ray intercept curves for the primary, secondary, and tertiary light rays at 70.7% field; and FIG. 6 is a curve showing the sagittal ray intercept curves for primary, secondary, and tertiary light at 100% field.

DESCRIPTION OF THE PREFERRED EMBODIMENTS

Figure 1:
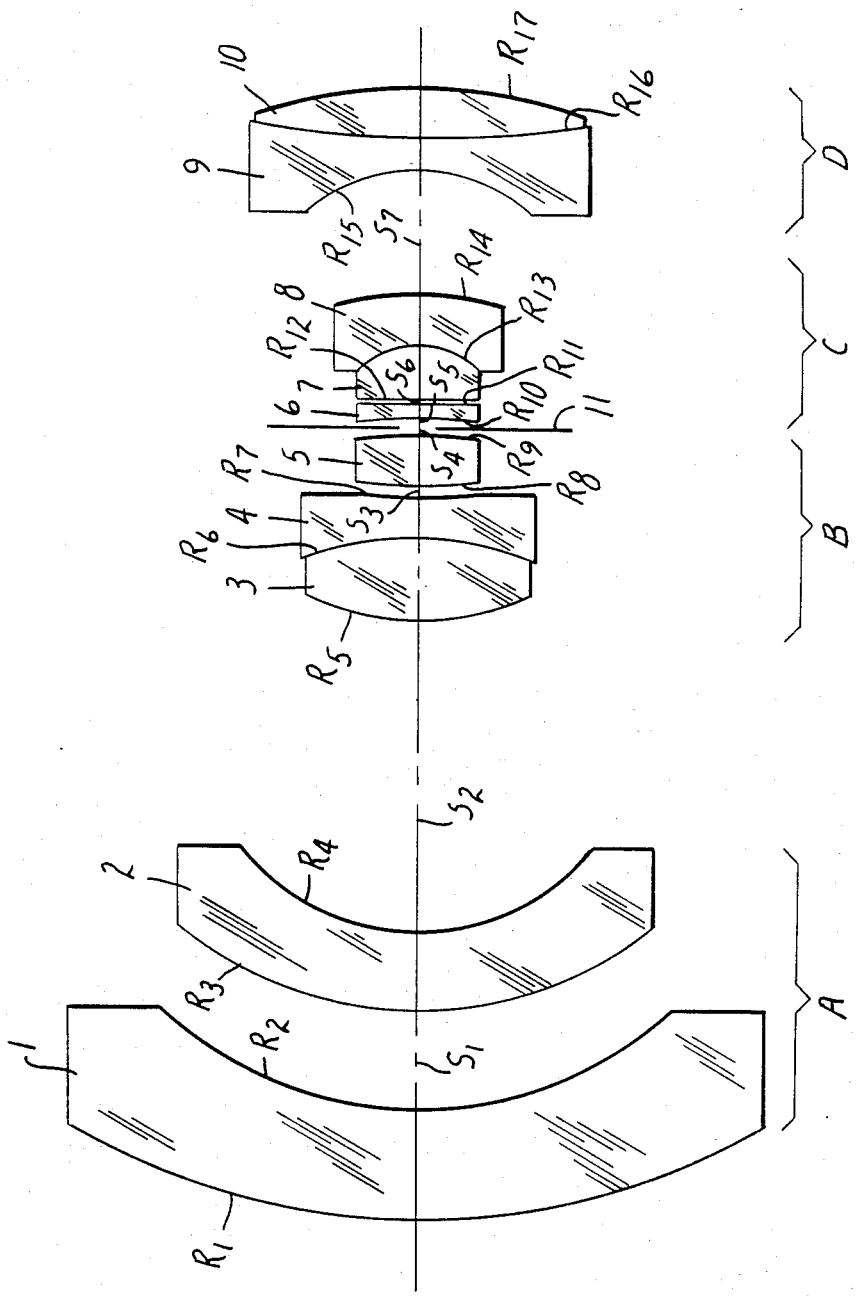
FIG. 1 is a diagram of a lens construction according to the present invention.

The micrographic lens of the present invention is an ultra-wide angle lens covering a half angle of 33 degrees. The lens comprises 10 elements. These 10 elements are divided into four general groups identified as A, B, C, and D. Group A comprises a pair of airspaced meniscus elements. The lens elements are identified by the numerals 1 and 2. Group B comprises a cemented doublet consisting of lens elements 3 and 4 and a biconvex singlet 5. Group C consists of a plano-concave singlet, element 6, and a cemented doublet, elements 7 and 8. Group D comprises a cemented doublet consisting of lens elements 9 and 10. An aperture stop 11 is located between the second and third groups. The aperture stop has a 7.88 mm opening yielding a finite f-number of f/5.6 at 30X for this 40.44 mm lens.

All the linear dimensions such as radii, thickness and airspacings are recited but not as absolute dimensions since this design may be scaled to provide focal lengths other than 40.44 mm. The numbers given are based on the equivalent focal length of the entire lens assembly. The radii of curvature of the front and rear surface of the first lens element 1 is recited as $R_1$ and $R_2$ and the radius of curvature of the second element is represented by the reference numerals $R_3$ and $R_4$, respectively. The last radii of curvature would be indicated as $R_{17}$. In the following table the values of the optical system are as follows wherein the radii are given in millimeters and numbered for the surfaces of the lens elements from front to rear as mentioned above. The thickness of the lens elements are given in millimeters for each lens element, the airspacings are given in millimeters and are numbered from front to rear i.e. $S_1$, $S_2$ etc., and the values for the glass are given with the Abbe number or respective dispersive V-value and the refractive index $N_d$ are given for each of the elements. The optical values of the optical system for a 30X magnification lens with an equivalent focal length of 40.44 mm are given in proportion to the entire lens as follows:

TABLE

| Lens Element | Surface | Radius mm | Thickness & airspace mm | $N_d$ | $V_d$ |
|---|---|---|---|---|---|
| 1 | $R_1$ | 71.913 | | | |
| | | | 11.63 | 1.48749 | 70.1 |
| | $R_2$ | 38.199 | | | |
| $S_1$ | | | 11.37 | | |
| | $R_3$ | 40.073 | | | |
| 2 | | | 8.58 | 1.48749 | 70.1 |
| | $R_4$ | 24.243 | | | |
| $S_2$ | | | 34.29 | | |
| | $R_5$ | 26.899 | | | |
| 3 | | | 9.68 | 1.72600 | 53.5 |
| | $R_6$ | −28.461 | | | |
| 4 | | | 3.97 | 1.70154 | 41.2 |
| | $R_7$ | 83.380 | | | |
| $S_3$ | | | 1.43 | | |
| | $R_8$ | 83.380 | | | |
| 5 | | | 5.55 | 1.71300 | 53.8 |
| | $R_9$ | −64.610 | | | |
| $S_4$ | | | 0.87 | | |
| 11 | STOP | 7.88 opening | | | |
| $S_5$ | | | 0.96 | | |
| | $R_{10}$ | −33.828 | | | |
| 6 | | | 1.58 | 1.51454 | 54.7 |
| | $R_{11}$ | ∞ | | | |
| $S_6$ | | | 0.25 | | |
| | $R_{12}$ | −441.682 | | | |
| 7 | | | 5.96 | 1.56384 | 60.7 |
| | $R_{13}$ | −9.403 | | | |
| 8 | | | 5.73 | 1.66446 | 35.7 |
| | $R_{14}$ | −26.506 | | | |
| $S_7$ | | | 14.03 | | |
| | $R_{15}$ | −17.896 | | | |
| 9 | | | 3.50 | 1.53172 | 48.9 |
| | $R_{16}$ | 101.558 | | | |
| 10 | | | 5.52 | 1.60342 | 38.0 |
| | $R_{17}$ | −59.392 | | | | wherein the negative values for the radii indicate a surface convex to the short conjugate.

In the 30X magnification lens configuration the fron conjugate is 1197.054 mm and the rear or short conjugate is 12.21 mm.

The diameters of the lenses are as follows: 1–71.0 mm, 2–47.9 mmm 3–23.0 mm, 4–23.2 mm, 5–13.3 mm, 6–9.6 mm, 7–12.1 mm, 8–16.5 mm, 9–34.8 mm, and 10–34.6 mm.

It will be noted that the glasses used in the lens provide ease of manufacture, and the axial thicknesses of the lenses are such that they exceed 10% of the diameter to avoid manufacturing difficulty.

The lens is utilized primarily for full frame reduction of engineering drawings to 35 mm. In microfilm and micrographic applications the demand is for lenses offering near diffraction-limited performance over wide half angles of 30° or more. For such demanding applications several problems must be solved. Distortion is difficult to control at large angles off axis. Also, as the field increases the elements on the long conjugate side of the lens assembly tend to become strongly curved. This adds to the cost of manufacture. Further, since $\cos^4$ law illumination losses become quite significant at large angles off axis, at large obliquities, it is imperative that the lens be free of vignetting at full field to maximize relative illumination. Simply enlarging element diameters to eliminate vignetting can result in individual lens elements which have very thin edges, making them difficult to mount in an assembly, and this often results in a thickness to diameter ratio of less than 10%, leading to difficulty in holding the accuracy of figure on individual glass surfaces, especially when strongly curved. The lens elements of the present system have a thickness to diameter ratio exceeding 10%.

When resolution approaching the diffraction limit is required, the full field imagery in the tangential direction is somewhat lower than in the sagittal direction. This effect is due to the reduced apparent angle the object subtends in the tangential direction relative to the lens. To maximize resolution in the tangential direction it is imperative that a lens be optimized for polychromatic light and have not only the normal chromatic aberration quantities corrected, but that the variation of monochromatic aberrations with wavelength be minimized as well. As the ray intercept curves of FIGS. 2 through 6 show, the deviations of relative ray position for the three reference wavelengths of light are slight, i.e. Helium d or green indicated by solid line reference numeral 20, Hydrogen F or blue indicated by broken line reference numeral 21, and Hydrogen C or red indicated by dash line reference numeral 22. This indicates very well controlled chromatic aberration and excellent correction of the monochromatic aberrations. Polychromatic diffraction optical transfer function evaluation with the spectral weight of $\lambda = 0.58756$ (Helium d) as 60%, $\lambda = 0.48613$ (Hydrogen F) as 20% and $\lambda = 0.65627$ (Hydrogen C) as 20% indicates that the lens of the present invention will produce modular transfer function at 160 lines/mm within 2 modulation transfer function units of the theoretical limit at full field, the theoretical limit being that at which all wavelength errors are identical to zero.

I claim:

1. An ultra-wide angle micrographic lens comprises ten lens elements comprising
   four groups of lenses airspaced from one another, a first group comprising a pair of airspaced meniscus lens elements of converging power, a second group comprising a cemented doublet and a biconvex singlet, the third group comprising a plano-concave singlet and a cemented doublet, and a fourth group comprising a cemented doublet, an aperture stop is located between the second and third groups, and said lens elements have a ratio of thickness to diameter equal to or exceeding ten percent.

2. An ultra-wide angle micrographic lens comprising ten lens elements having a half angle of 33 degrees and an effective focal length of 40.44 mm, said lens having the characteristics of the lens elements and spacial relationship substantially as follows:

| Lens Element | Surface | Radius mm | Thickness & airspace mm | $N_d$ | $V_d$ |
|---|---|---|---|---|---|
| 1 | $R_1$ | 71.913 | | | |
| | | | 11.63 | 1.487 | 70.1 |
| | $R_2$ | 38.199 | | | |
| | | | 11.37 | | |
| 2 | $R_3$ | 40.073 | | | |
| | | | 8.58 | 1.487 | 70.1 |
| | $R_4$ | 24.243 | | | |
| | | | 34.29 | | |
| 3 | $R_5$ | 26.899 | | | |
| | | | 9.68 | 1.726 | 53.5 |
| | $R_6$ | −28.461 | | | |
| 4 | | | 3.97 | 1.701 | 41.2 |
| | $R_7$ | 83.380 | | | |
| | | | 1.43 | | |
| 5 | $R_8$ | 83.380 | | | |
| | | | 5.55 | 1.713 | 53.8 |
| | $R_9$ | −64.610 | | | |
| | | | 0.87 | | |
| 11 | STOP | 7.88 opening | | | |

-continued

| Lens Element | Surface | Radius mm | Thickness & airspace mm | $N_d$ | $V_d$ |
|---|---|---|---|---|---|
| | | | 0.96 | | |
| | $R_{10}$ | −33.828 | | | |
| 6 | | | 1.58 | 1.514 | 54.7 |
| | $R_{11}$ | ∞ | | | |
| | | | 0.25 | | |
| | $R_{12}$ | −441.682 | | | |
| 7 | | | 5.96 | 1.564 | 60.7 |
| | $R_{13}$ | −9.403 | | | |
| 8 | | | 5.73 | 1.664 | 35.7 |
| | $R_{14}$ | −26.506 | | | |

-continued

| Lens Element | Surface | Radius mm | Thickness & airspace mm | $N_d$ | $V_d$ |
|---|---|---|---|---|---|
| | $R_{15}$ | −17.896 | 14.03 | | |
| 9 | | | 3.50 | 1.532 | 48.9 |
| | $R_{16}$ | 101.558 | | | |
| 10 | | | 5.52 | 1.603 | 38.0 |
| | $R_{17}$ | −59.392 | | | | wherein the negative values for the radii indicate a surface convex to the short conjugate, all dimensions are expressed in millimeters, $N_d$ indicates the refractive indices for the lens elements expressed in reference to the helium d line, and $V_d$ indicates the Abbe number of the material of the lens elements.

* * * * *